(12) United States Patent
Fukuoka et al.

(10) Patent No.: US 7,176,802 B2
(45) Date of Patent: Feb. 13, 2007

(54) RADIO IC TAG READER, RADIO IC TAG READ APPARATUS AND RADIO IC TAG READ SYSTEM

(75) Inventors: Shinichiro Fukuoka, Shiga-ken (JP); Hidemi Nakamura, Tottori-ken (JP)

(73) Assignee: Omron Corporation, Kyoto (JP)

(*) Notice: Subject to any disclaimer, the term of this patent is extended or adjusted under 35 U.S.C. 154(b) by 112 days.

(21) Appl. No.: 10/653,185

(22) Filed: Sep. 3, 2003

(65) Prior Publication Data

US 2004/0056760 A1 Mar. 25, 2004

(30) Foreign Application Priority Data

Sep. 13, 2002 (JP) ............... P.2002-267530

(51) Int. Cl.
*G08B 13/14* (2006.01)
(52) U.S. Cl. .................................. 340/572.7
(58) Field of Classification Search ......... 340/572.7; 700/215, 217, 221; 235/385, 439; 343/872, 343/873
See application file for complete search history.

(56) References Cited

U.S. PATENT DOCUMENTS

| | | | |
|---|---|---|---|
| 5,361,061 A | * | 11/1994 | Mays et al. ............ 340/7.54 |
| 6,147,606 A | * | 11/2000 | Duan .................... 340/572.7 |
| 6,232,870 B1 | * | 5/2001 | Garber et al. ............ 340/10.1 |
| 6,366,261 B1 | * | 4/2002 | Stout et al. ................ 343/872 |
| 6,369,694 B1 | | 4/2002 | Mejia |
| 6,448,886 B2 | * | 9/2002 | Garber et al. ............ 340/10.1 |
| 6,486,780 B1 | * | 11/2002 | Garber et al. ........... 340/572.1 |
| 6,768,419 B2 | * | 7/2004 | Garber et al. ........... 340/572.4 |
| 2001/0008390 A1 | | 7/2001 | Berquist et al. |

FOREIGN PATENT DOCUMENTS

| | | |
|---|---|---|
| CN | 1078054 A | 11/1993 |
| CN | 1349472 A | 5/2002 |
| JP | 2001-28510 | 1/2001 |
| JP | A-2001-014433 | 1/2001 |
| JP | A-2001-256447 | 9/2001 |
| JP | A-2001-307244 | 11/2001 |
| JP | A-2002-002917 | 1/2002 |
| JP | 2002-522849 | 7/2002 |
| JP | 2002-522857 | 7/2002 |

* cited by examiner

*Primary Examiner*—John Tweel, Jr.
(74) *Attorney, Agent, or Firm*—Dickstein Shapiro LLP

(57) ABSTRACT

A radio IC tag reader includes an antenna capable of conducting radio communications with an IC tag on which predetermined data is recorded, the IC tag being attached to an article. An antenna sheath for housing the antenna is formed as a flat body and both sides of the flat body are placed in an open state.

10 Claims, 10 Drawing Sheets

RADIO IC TAG READER, RADIO IC TAG READ APPARATUS AND RADIO IC TAG READ SYSTEM

FIELD OF THE INVENTION

This invention relates to a radio IC tag reader, a radio IC tag read apparatus, and a radio IC tag read system for reading data recorded on IC tags attached to articles such as books, CDs, DVDs, videotapes, software packages, clothing items, or foods placed on shelves, for example.

DESCRIPTION OF THE RELATED ART

Hitherto, to accurately and easily manage an enormous number of books managed in a library, for example, a book stock management system (article management system) implemented as a radio IC tag read system, etc., has been demanded. Such a system needs to conduct management as to what books are stored on which shelves.

To meet the requirements, a hand-held RFID (Radio Frequency Identification) apparatus as shown in JP-T-2002-522849 (the term "JP-T" as used herein means a published Japanese translation of a PCT patent application) and a hand-held RFID apparatus as shown in JP-T-2002-522857 each for reading information from an RFID element corresponding to an article (book) are proposed.

These are highly convenient systems that can read information from the RFID elements attached to books in a state in which the books are stored on a shelf, and can save the worker from having to take out the books from the shelf.

However, to read information intact from the RFID element attached to each book actually placed on a shelf, a physically difficult problem is involved.

That is, letting the inductance of an antenna coil of the RFID element be L, the inductance of a capacitor of the RFID element be C, and the mutual inductance with an antenna coil of another RFID element existing near by be M, the resonance frequency for reading information is found according to the following calculation expression:

$$f = \frac{1}{2\pi\sqrt{(L+2M) \times C}} \quad \text{[Expression 1]}$$

Thus, as the RFID elements approach each other, M increases and the provided resonance frequency lessens. Therefore, if thin books are placed, it is impossible to normally read information.

For the book from which the RFID element information cannot be read, it becomes necessary to take out the book from the shelf for reading the information, resulting in lack of convenience.

SUMMARY OF THE INVENTION

It is therefore an object of the invention to provide a radio IC tag reader, a radio IC tag read apparatus, and a radio IC tag read system that can read ID tag information without taking out a thin article including an ID tag if the article is placed on a shelf for shortening the article management work time and decreasing the article management labor, thereby improving the work efficiency.

According to a first aspect of the invention, there is provided a radio IC tag reader comprising:

an antenna capable of conducting radio communications with an IC tag on which predetermined data is recorded, the IC tag being attached to an article;

a main unit for supplying power to the antenna; and an antenna sheath for housing the antenna, the antenna sheath having a flat body attached to a front side of the main unit.

The articles may include books, CDs, DVDs, videotapes, software packages, clothing items, foods, etc.

The IC tag may include an RFID tag including an antenna coil and a storage section and may be formed like a shape of a thin card, a chip, etc., easily stuck on an article. The RFID tag may or may not include a control section or a logic circuit.

The antenna may be formed of a metal wire such as iron wire or a copper wire and may be formed as a single coil or a double coil.

The antenna sheath may be formed like a bond shape having flat plates by which the antenna can be sandwiched and surrounded, a grooved shape including a groove in which an antenna can be buried, or a stick-possible shape in which an antenna can be stuck with an adhesive, etc.

The flat body may be made of a plate body having flat surfaces being opposed each other, such as a plate square body, a plate circle body, or a plate ring body and may be formed like a thin plate body which is linear on a side view. The flat body may be formed so that both side surfaces are always open or may be formed so that the flat body can be folded or housed and both side surfaces can be opened as desired. Herein, the both side surfaces of the flat body in the "open state" means the radio communication can be performed at the both sides of the antenna housed in the antenna sheath.

The flat body may have one side being attached to the main unit and the other side being chamfered for preventing damage to the article when the antenna sheath is inserted between the articles. Preferably, corners of the other side of the antenna sheath are chamfered for preventing damage to the articles when the antenna sheath is inserted between the articles.

The radio IC tag reader may be implemented as a radio IC tag reader-writer for executing write as well as IC tag read.

As a preferred embodiment, the radio IC tag reader further comprises a hold portion including a plurality of hold parts different in hold angle of a hand of a user.

The hold portion may be implemented as a section that can be held by the user. The hold portion may be formed separately from the main unit and attached to the main unit or may be formed integrally with the main unit. For example, a hold portion has a bar body, etc., which is attached to the main unit and can be held by the user, or a hold portion is formed with a concave part and/or a convex part in a part of the main unit so that the user easily holds.

The main unit may have a housing space inside thereof for housing the antenna and the antenna sheath.

According to a second aspect of the invention, there is provided a radio IC tag read apparatus including a radio IC tag reader according to the first aspect of the invention and a communication controller being connected to the radio IC tag reader for performing communication control.

The communication controller may be implemented as an apparatus for transmitting and receiving a signal to and from the radio IC tag reader.

According to a third aspect of the invention, there is provided a radio IC tag read system including a computer that can be connected to the communication controller of the radio IC tag read apparatus according to the second aspect of the invention, wherein received data recorded on an IC tag can be checked in the computer.

The computer may be implemented as an electronic computer that can check data, such as a desktop PC (personal computer), a notebook PC, or a portable information terminal such as a PDA (personal digital assistant) or a mobile telephone.

According to the above-mentioned aspects of the invention, usually the user traces the back of an article placed on a shelf using the antenna sheath to read data recorded on the IC tag put on the article. The user may move the radio IC tag reader in a lateral direction while bringing the antenna sheath into contact with the back of the article or may move the radio IC tag reader in a lateral direction in an approach state in a noncontact manner. If the article is thin and the data cannot be read, the user can insert the antenna together with the antenna sheath between adjacent articles to read the data without taking out the article out of the shelf.

This eliminates the need for a formerly performed work sequence of taking out thin articles one at a time out of a shelf to read data and after reading the data, restoring the articles to the shelf. It is possible for the user to simply insert the antenna together with the antenna sheath between the articles to read the data recorded on the ID tags of a plurality of articles at a time.

It is possible for the user to check whether or not data is read in either or both of the communication controller and the computer and it is also possible to organize the read data in the computer for managing the articles existing on the shelves.

DETAILED DESCRIPTION OF THE INVENTION

Referring now to the accompanying drawings, there is shown one preferred embodiment of the invention.

Figure 1:
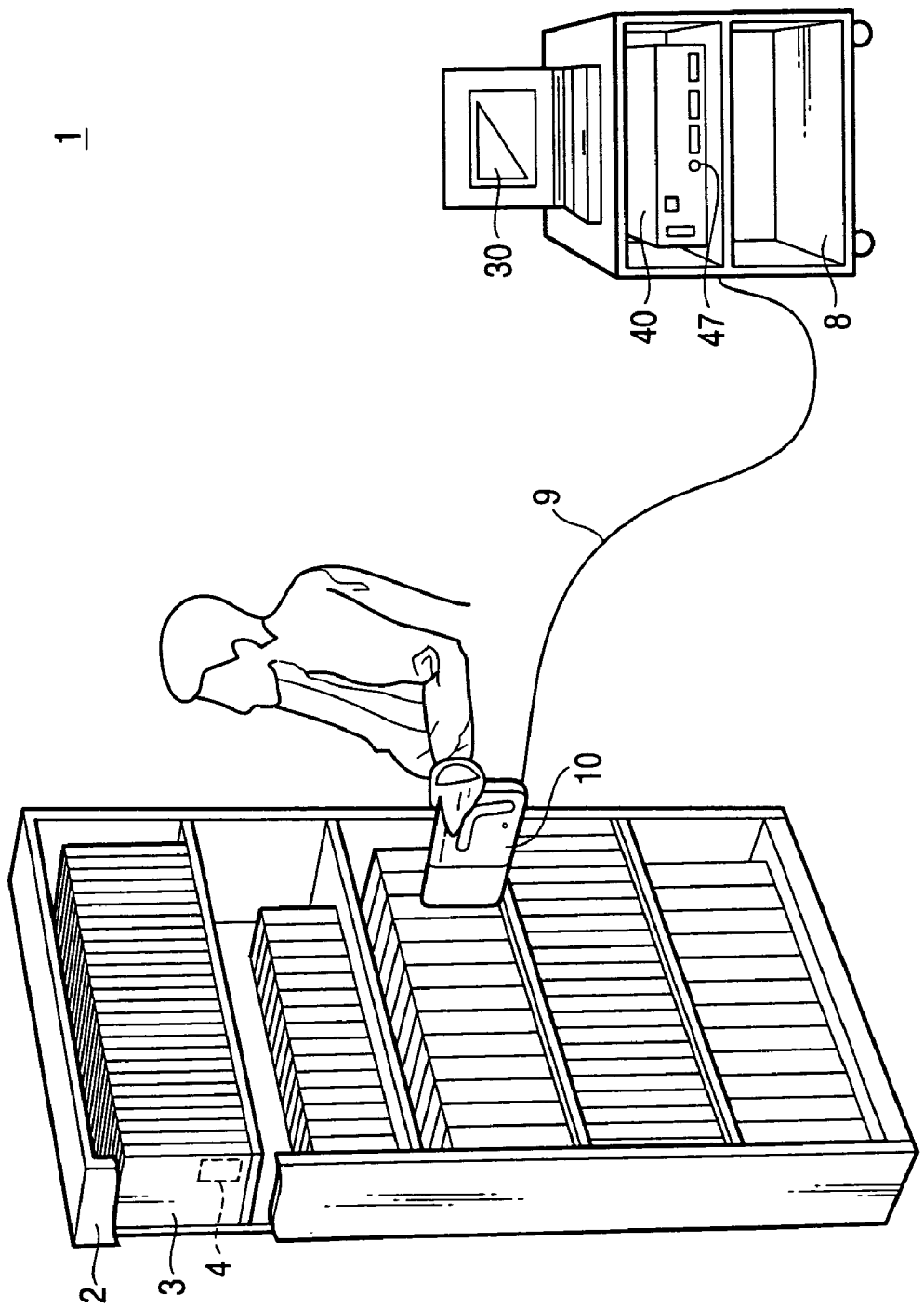
FIG. 1 is a drawing to show the system configuration of a book management system.

To begin with, the system configuration and components of a book management system 1 will be discussed with reference to FIG. 1 (drawing to show the system configuration of the book management system 1), FIG. 2 (plan view of an RF tag 4), FIG. 3 (perspective view of a handy scanner 10), and FIG. 4 (sectional view of the right side of the handy scanner 10).

In the book management system 1, an RF tag 4 is previously stuck on the inside of the back cover or between the jacket and the back cover of a book 3 with an adhesive, and the book 3 with the RF tag 4 stuck is stored on a book shelf 2.

The book management system 1 includes a handy scanner 10, a communication controller 40, and a notebook PC (personal computer) 30. The handy scanner 10 communicates with the RF tag 4. The communication controller 40 transmits and receives a signal to and from the handy scanner 10. The notebook PC 30 receives data recorded on the RF tag 4 from the communication controller 40 and conducts management as to which shelf 2 the book 3 is stored on, etc.

The notebook PC 30 serves as a host function for executing organization of the received data, etc., and can be moved as it is placed on a pedestal 8 on casters together with the communication controller 40.

Figure 2:
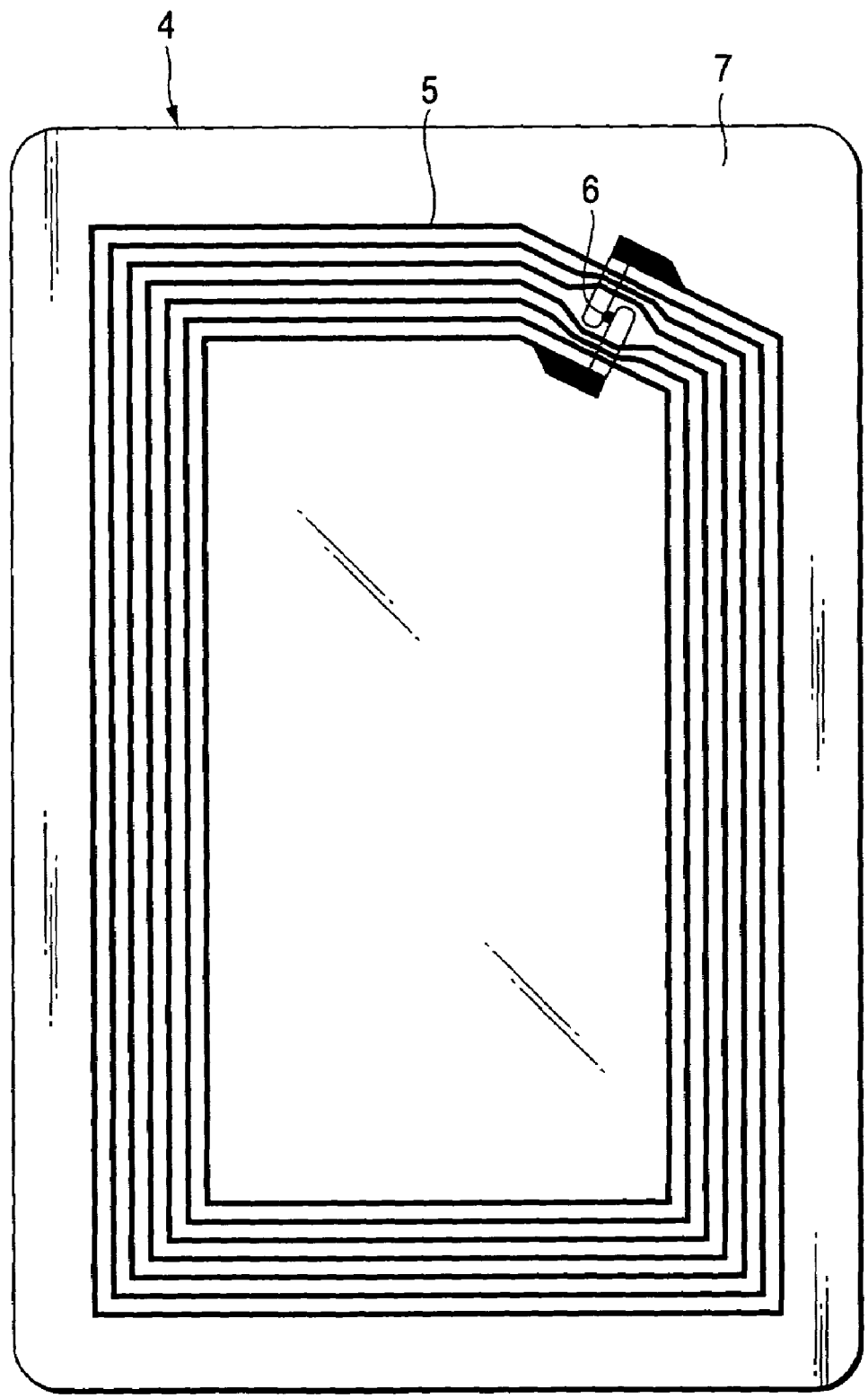
FIG. 2 is a plan view of an RF tag.
Figure 3:
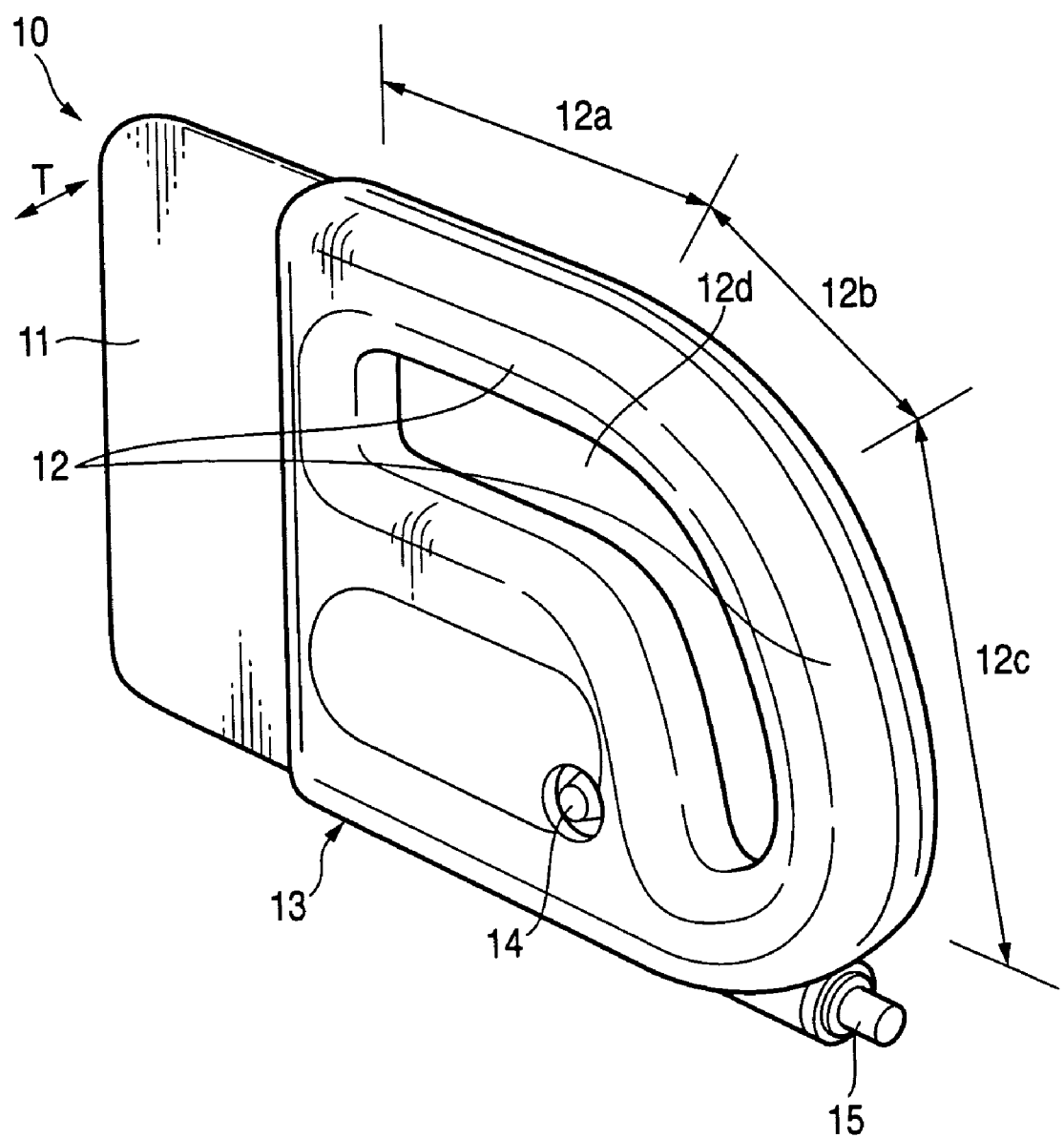
FIG. 3 is a perspective view of a handy scanner.

As shown in FIG. 2, the RF tag 4 includes an antenna coil 5 having a copper wire formed like a coil and an IC chip 6 storing data. The antenna coil 5 and the IC chip 6 are sandwiched between rectangular transparent sheets 7 for protection.

The handy scanner 10 comprises an antenna sheath 11 and a main unit (housing case) 13. The antenna sheath 11 is formed like a parallelogram plate (namely, flat body). As shown in the perspective view from the upper right of the rear of the handy scanner 10 (FIG. 3), the handy scanner 10 is formed by attaching one side of the antenna sheath 11 to the front of the main unit 13.

Figure 7:
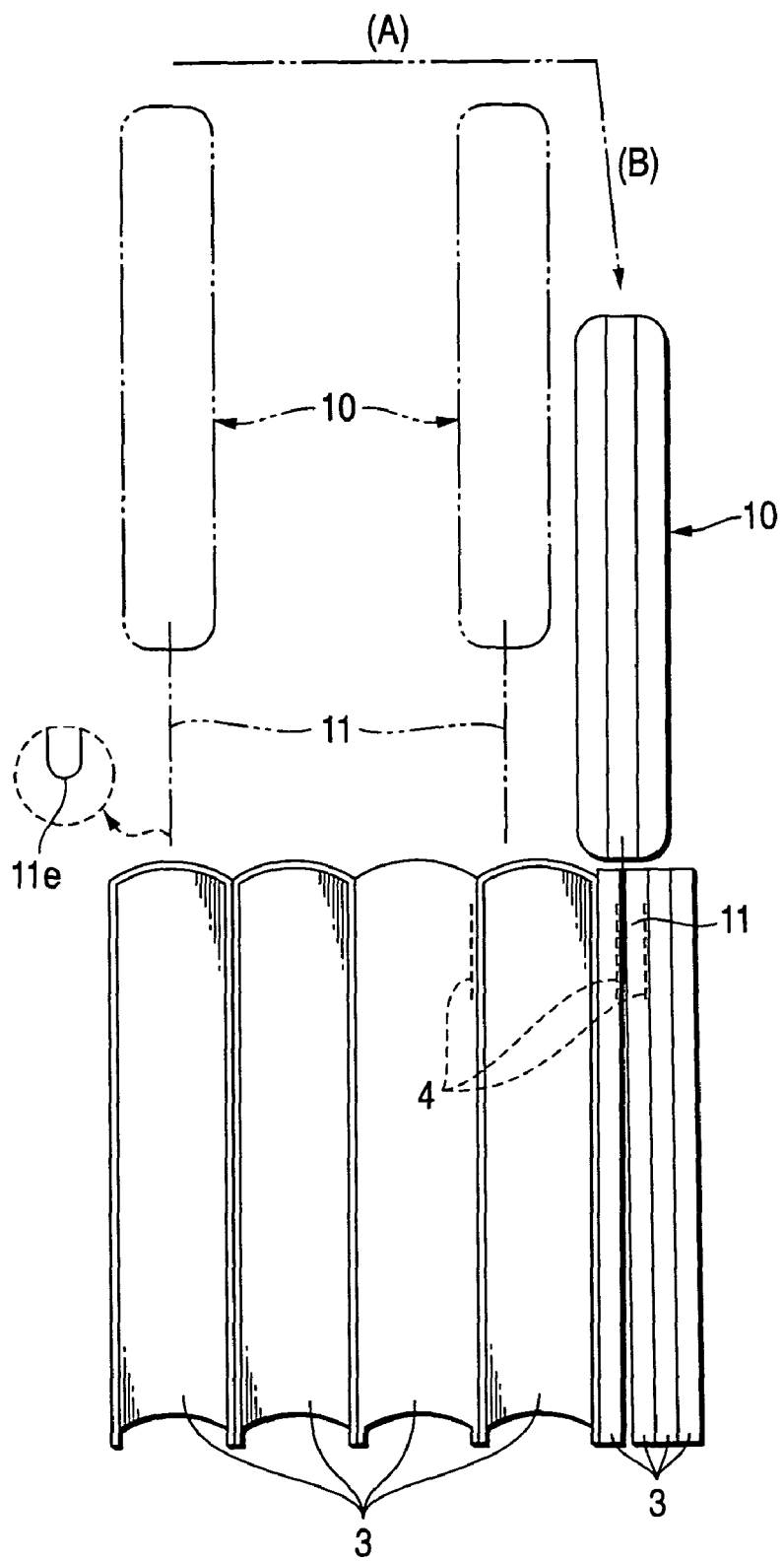
FIG. 7 is a schematic representation of a scanning method of the handy scanner.

Another side 11e of the antenna sheath 11 which is opposite to the one side attached to the main unit 13 is chamfered for preventing damage to the books 3 when the antenna sheath 11 is inserted between the two books in intimate contact with each other as shown in FIG. 7. Corners 11d of another side 11e of the antenna sheath 11 are also chamfered for preventing damage to the books 3 when the antenna sheath 11 is inserted. A thickness T of the antenna sheath 11 is preferably in the range of from 1mm to 2mm. If the thickness T is too thin, it is hard to build the antenna wire into the antenna sheath and the strength of the antenna sheath becomes smaller. If the thickness T is too thick, it is hard to insert the antenna sheath between the books.

The main unit 13 includes a hold portion 12 and an operation switch 14. The hold portion 12 is formed as a shape with a slope from the top to the rear, and includes a horizontal part 12a, a curve part 12b and a vertical part 12c. The operation switch 14 is disposed in a lower part of the right side and switches on/off an antenna 16. The hold portion 12 is formed in an adequate thickness so that it is easily grasped by a hand and can be held for hours without fatigue. The main unit 13 has a recess portion 12d formed along the hold portion 12, in which fingers of the use can be inserted when the user grasps the hold portion 12. The recess portion 12d is also formed in an adequate depth so that it is easily grasped by a hand and can be held for hours without fatigue. The recess portion 12d may be formed as a hole.

A connection part (cable CN) 15 for connecting a coaxial cable 9 (FIG. 1) is placed in a lower part of the rear of the main unit 13.

Figure 4:
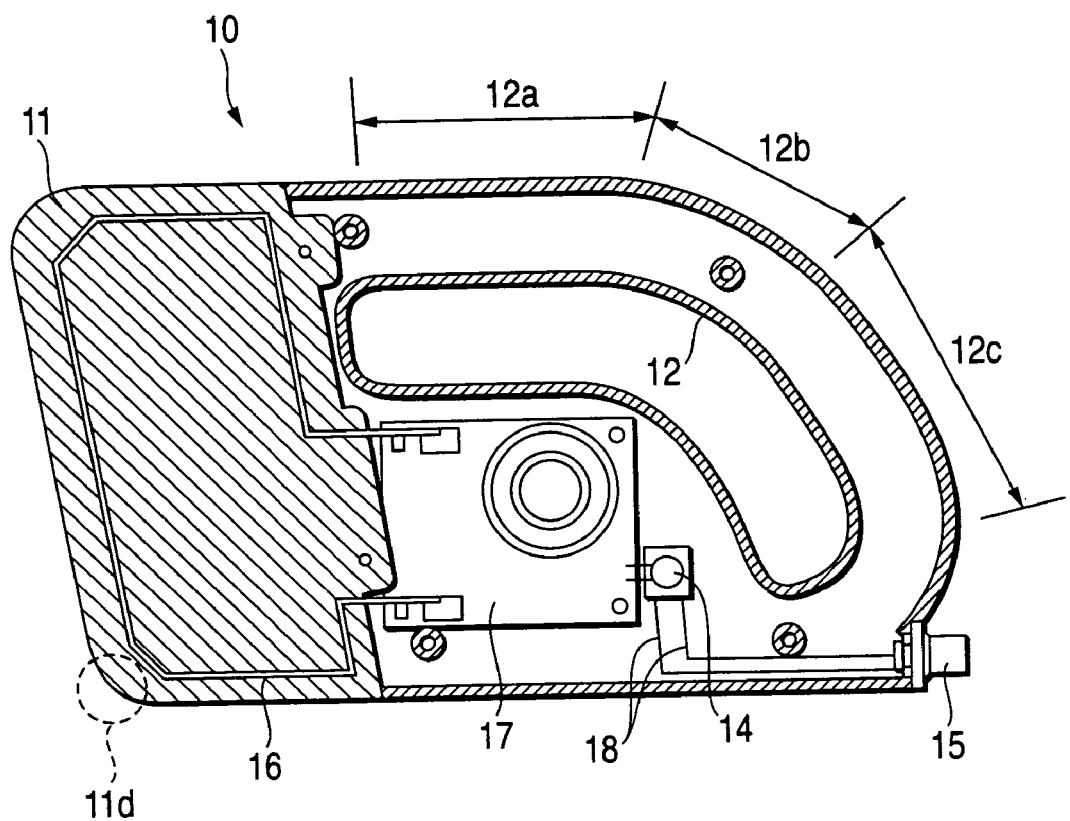
FIG. 4 is a sectional view of the right side of the handy scanner.

The handy scanner 10 includes an antenna (antenna element) 16, an impedance matching circuit (matching board) 17, the operation switch 14, and a cable 18, as shown in FIG. 4.

The antenna 16 is put along the inside of the outer periphery of the antenna sheath 11 and forms a single coil. The antenna 16 is formed of an iron wire having an adequate thickness. As power is supplied, the antenna 16 generates heat a little and radiates heat from the antenna sheath 11. The metal member having a high resistance value is thus used, whereby it is possible to lessen the resistance value of a resistor placed in the impedance matching circuit 17 for suppressing heat generation of the resistor.

The impedance matching circuit 17 stably supplies power supplied from the coaxial cable 9 (FIG. 1) through the connection part 15, the cable 18, and the operation switch 14 to the antenna 16.

The operation switch 14 switches on/off power supply to the antenna 16 and the impedance matching circuit 17.

According to the described configuration, the user can read data on the RF tag 4 stuck on the book 3 by communicating with the RF tag 4 through the antenna 16 of the handy scanner 10 and store the data in the notebook PC 30 for managing the storage location of the book 3 (namely, shelf 2), the number of stored books, etc.

Figure 5:
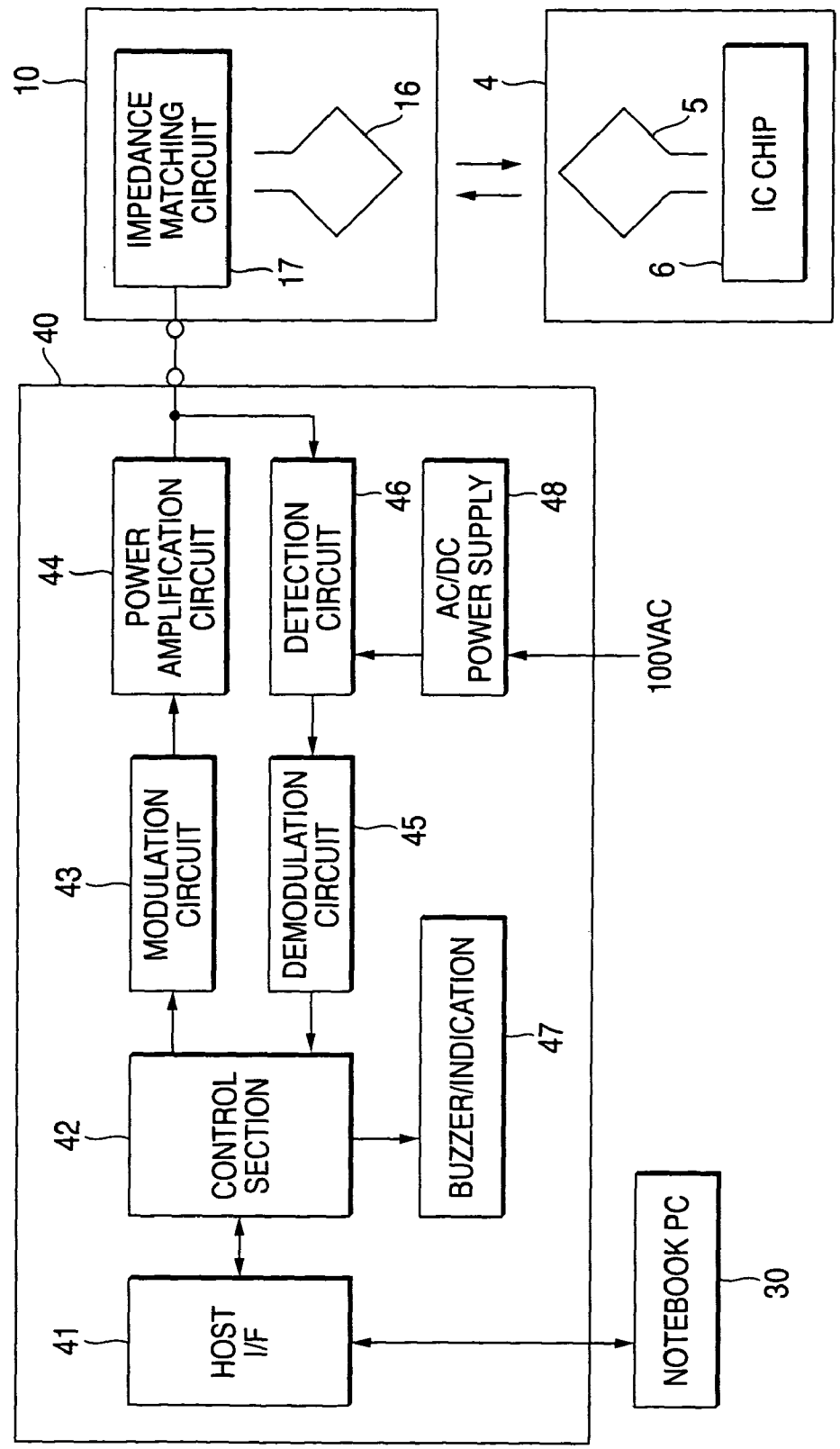
FIG. 5 is a circuit block diagram of the book management system.

Next, the circuit configuration of the book management system 1 will be discussed with FIG. 5 (circuit block diagram).

The communication controller 40 includes a control section 42 for executing various types of control processing. A host interface 41 is connected to the control section 42 for making it possible to communicate with the notebook PC 30 connected to the host interface 41. Accordingly, the control section 42 executes communication control with the RF tag 4 in accordance with a control instruction from the notebook computer 30.

The control section 42 transmits a digital signal to a modulation circuit (modulation means) 43, which then converts the digital signal into an analog signal and inputs the analog signal to a power amplification circuit 44. The power amplification circuit 44 amplifies the analog signal and transmits the amplified analog signal to the handy scanner 10 via the coaxial cable 9.

Upon reception of the analog signal, the impedance matching circuit 17 of the handy scanner 10 stabilizes power and transmits the analog signal to the antenna 16.

The antenna coil 5 of the RF tag 4 is affected by a magnetic field produced at the antenna 16, and the IC chip 6 obtains an electromotive force and transmits the recorded IC data from the antenna coil 5 as a data signal.

The IC chip 6 includes a power supply circuit (power supply means), an A/D converter (modulation means), a D/A converter (demodulation means), a logic circuit (logic means or control means of CPU, etc.,), and nonvolatile memory (storage means). The nonvolatile memory stores predetermined data such as the ID uniquely assigned to the RF tag 4 and book data of the title, the author, etc., of the book 3 on which the RF tag is stuck. The nonvolatile memory specifically can be implemented as FRAM or EEPROM.

The antenna 16 of the handy scanner 10 receives the data signal from the RF tag 4 and transmits the data signal through the impedance matching circuit 17 and the coaxial cable 9 to the communication controller 40.

Upon reception of the data signal, in the communication controller 40, a detection circuit 46 detects the data signal and a demodulation circuit (demodulation means) 45 converts the data signal into digital data and sends the IC data (digital data) to the control section 42.

The control section 42 informs the user of reception of the IC data using a buzzer/indication section 47. That is, the control section 42 sounds a beep from a loudspeaker of the buzzer/indication section 47 and turns on an LED of buzzer/indication section 47 for a predetermined time.

The control section 42 also transmits the IC data through the host interface 41 to the notebook PC 30.

Power for driving the communication controller 40 is received through an AC/DC power supply (power supply means) 48 from commercial power supply 100 VAC.

According to the described circuit configuration, communications can be conducted between the antenna 16 of the handy scanner 10 and the antenna coil 5 of the RF tag 4 for acquiring the IC data recorded in the IC chip 6. When the IC data is acquired, the buzzer/indication section 47 informs the user, so that the user can continue scanning (reading) while checking that the data has been read.

Next, the use method of the handy scanner 10 will be discussed with reference to FIG. 6 (schematic representation of magnetic field of the handy scanner 10), FIG. 7 (schematic representation of scanning method), and FIG. 8 (schematic representation of scanning-attitudes).

Figure 6:
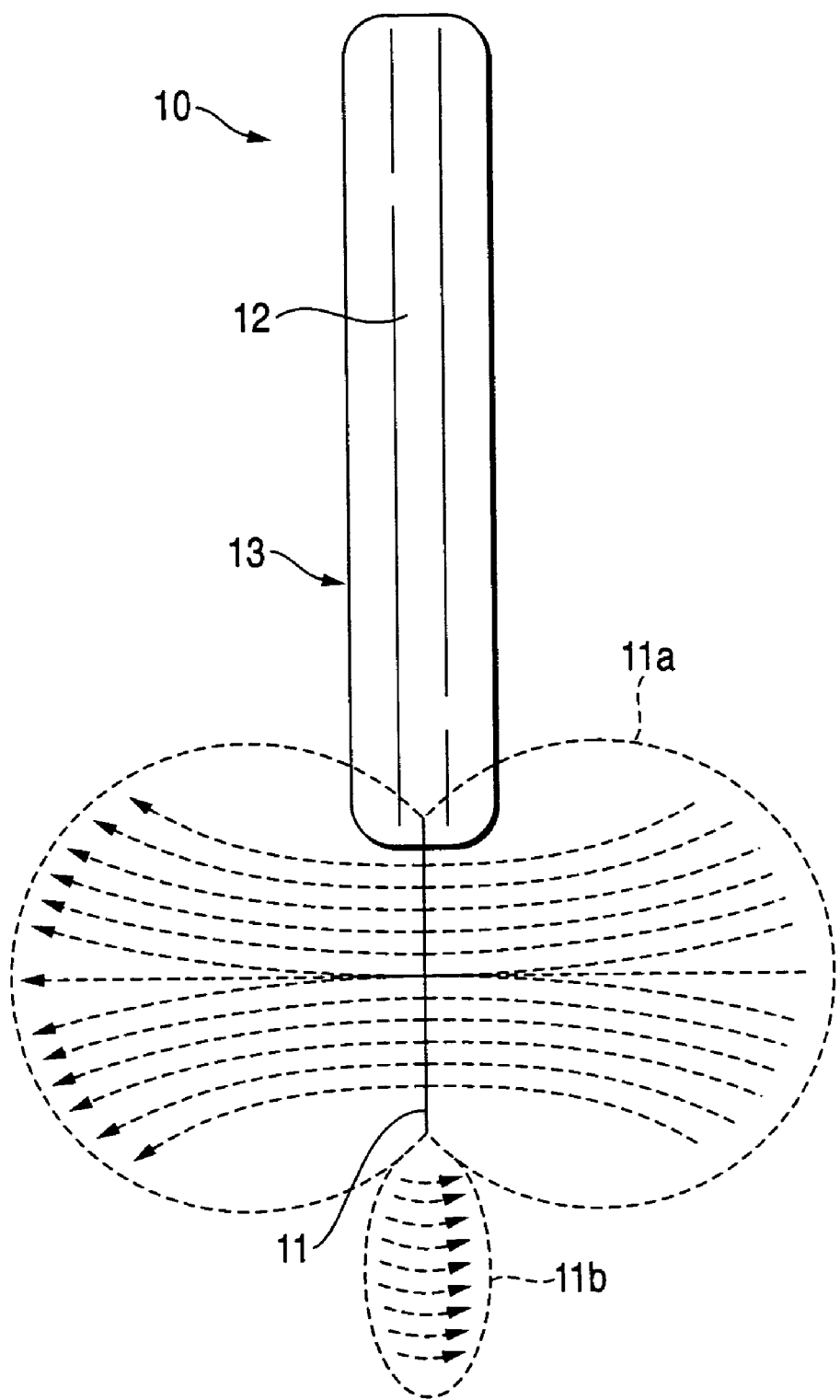
FIG. 6 is a schematic representation of a magnetic field of the handy scanner.

The handy scanner 10 produces an AC magnetic field changing in direction depending on a carrier frequency from the antenna 16 in the antenna sheath 11; as the instant is shown, a magnetic field is produced in the direction indicated by arrows shown in FIG. 6 (plan view). That is, first a strong magnetic field in one direction is produced on the left and right faces of the antenna sheath 11 as indicated by hidden lines, forming a strong communication area 11a indicated by the phantom line.

A weak magnetic field in an opposite direction (opposite direction to the magnetic field in the strong communication area 11a) by a side lobe is produced on the front of the antenna sheath 11 as indicated by hidden lines, forming a weak communication area 11b indicted by the phantom line.

The two magnetic fields different in direction are thus produced while the directions are changed depending on the carrier frequency.

The strong communication area 11a and the weak communication area 11b are used to execute scanning as shown in FIG. 7 (plan view).

First, for a book 3 having a usual thickness or a thick book 3, the user scans over a back cover of the book 3 or a jacket covering the book 3 so as to trace the back cover or jacket using the periphery of the front of the antenna sheath 11 as indicated by phantom line (A). At this time, the weak communication area 11b is used for conducting communications with the RF tag 4 in the area. At the scanning time, the user may move the handy scanner in a lateral direction while bringing the antenna sheath 11 into contact with the back cover of the book 3 or jacket covering the book 3 or may move the handy scanner in a lateral direction in an approach state in a noncontact manner.

Next, for thin books 3, the spacing between the RF tags 4 of the adjacent books 3 becomes narrow as shown in the right side of FIG. 7 and a sufficient resonance frequency cannot be provided in the magnetic field strength in the weak communication area 11b using the side lobe and normal communications may not be conducted.

Then, the user inserts the antenna sheath 11 of the handy scanner 10 between the thin books 3 as indicated by phantom line (B). At this time, if the user holds the vertical part 12c of the hold portion 12 (FIG. 4) and inserts the antenna sheath 11, the user's hand holding the part, the hold portion 12, and the antenna sheath 11 are aligned on the plan view and the side view and a force is easily applied. Therefore, it is possible to insert the antenna sheath 11 into the gap between the books 3 without difficulty.

As the antenna sheath 11 is thus inserted, the strong communication area 11a can be used, a plurality of RF tags 4 existing with a narrow spacing can be given a strong magnetic field to such an extent that the effect of another nearby RF tag is excluded, and a sufficient resonance frequency can be provided for communicating with the RF tag 4 in the strong communication area 11*a*.

At this time, in addition to the RF tags 4 of the books 3 adjacent with the side of the antenna sheath 11, other RF tags 4 outside the RF tags 4 adjacent with the antenna sheath 11 can also be read, and the antenna sheath 11 can also be inserted every four to five books for reading the RF tags 4 without omission.

To read the IC data from a plurality of the RF tags 4, the modulation-demodulation system defined in ISO/IEC 15693-2 and the communication protocol and anticollision defined in ISO/IEC 15693-3 are used, but any other system may be adopted.

Figure 8:
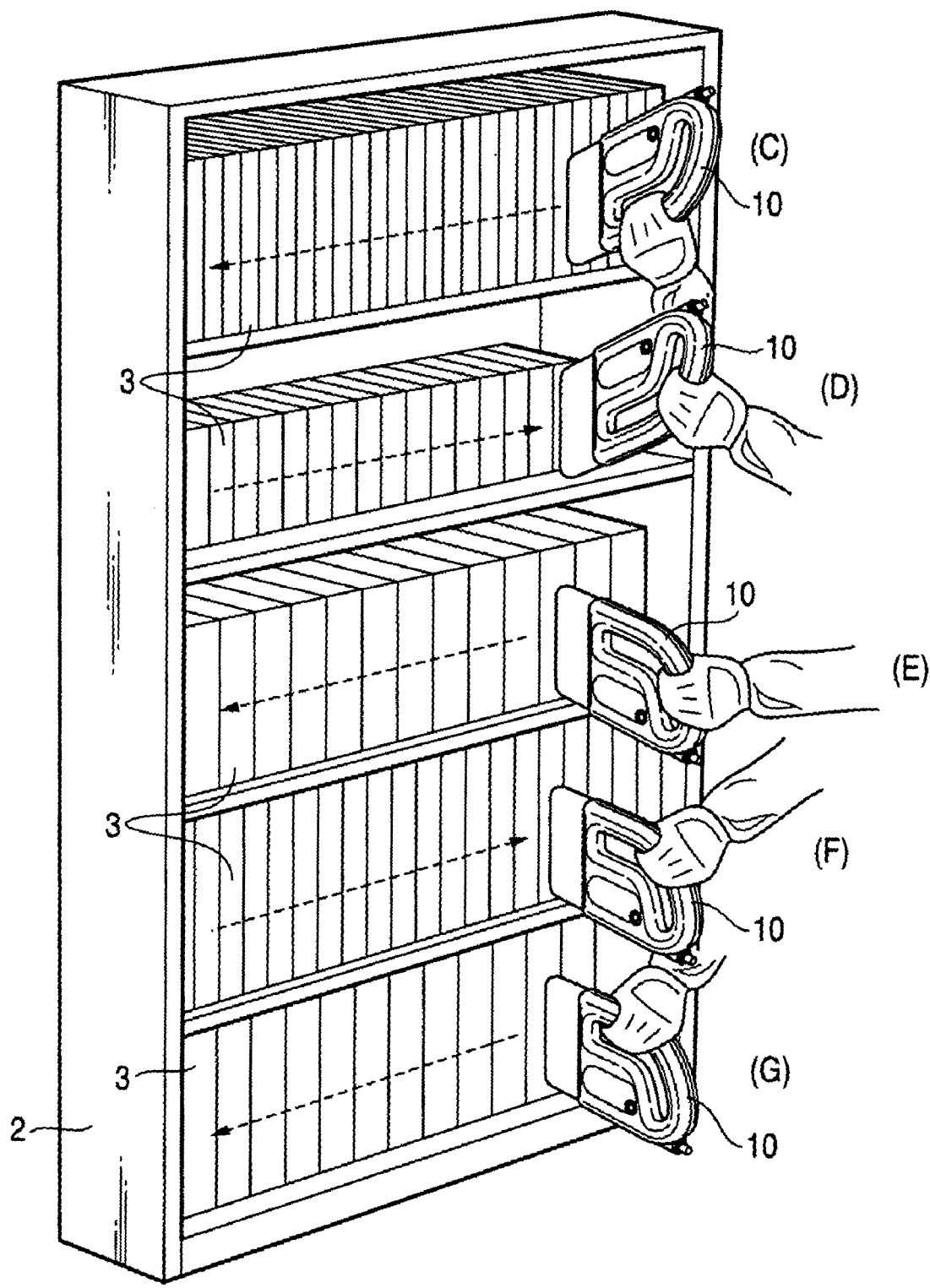
FIG. 8 is a schematic representation of scanning attitudes of the handy scanner.

The handy scanner 10 is held in various manners as shown in FIG. 8 (schematic representation of scanning attitudes).

The book 3 at the top stage, namely, at a high position (height as high as the top of the head of the user), the handy scanner 10 is turned upside down and the user holds the horizontal part 12*a* of the hold portion 12 (FIG. 3), as shown in (C).

The book 3 at an upper stage, namely, at a slightly high position (height as high as from the shoulder position to the face of the user), the handy scanner 10 is turned upside down and the user holds the curve part 12*b* of the hold portion 12 (FIG. 3), as shown in (D).

The book 3 at a medium stage, namely, at a medium high position (height as high as the belly of the user), the handy scanner 10 is placed in the positive direction and the user holds the vertical part 12*c* of the hold portion 12 (FIG. 3), as shown in (E).

The book 3 at a lower stage, namely, at a slightly low position (height as high as the thigh of the user), the handy scanner 10 is placed in the positive direction and the user holds the curve part 12*b* of the hold portion 12 (FIG. 3), as shown in (F).

The book 3 at the bottom stage, namely, at a low position (height as high as the knee of the user), the handy scanner 10 is placed in the positive direction and the user holds the horizontal part 12*a* of the hold portion 12 (FIG. 3), as shown in (G).

As the user holds the handy scanner 10 as described above, it is possible for the user to easily hold the handy scanner 10 without taking an unnatural posture, enabling the user to scan over even a large number of books in a library for many hours without difficulty.

The handy scanner 10 is formed with the horizontal part 12*a*, the curve part 12*b*, and the vertical part 12*c* for the user to easily hold the hold portion 12, but the user is not limited to the holding manners described above and may hold the hold portion 12 (handy scanner 10) in any easy-to-hold manner thereof. In FIG. 8, the user holds the hold portion 12 (handy scanner 10) with his or her left hand, but can continue work without fatigue by changing the hand holding the hold portion 12 (handy scanner 10) in such a manner that the user holds the hold portion 12 (handy scanner 10) with his or her left hand in (C) and with his or her right hand in (D). In addition, to read the RF tag 4 of the book 3 at the upper stage, the user may scan over the book 3 holding the bottom part of the main unit 13 without turning the handy scanner 10 upside down. That is, the user can also hold the main unit 13 in such a manner because the main unit 13 is formed in a thickness to such an extent that the main unit 13 fits in the palm of an ordinary person.

The described book management system 1 enables the user to scan over the books 3 of various thicknesses, stored on the shelves 2. Accordingly, it is possible to improve the work efficiency and shorten the work time. The user easily scans over books using the hold portion 12 designed for the user to work for many hours without fatigue.

In the embodiment, the communication controller 40 may be formed like a small compact unit as a portable communication controller, which may include a battery in place of the AC/DC power supply 48. Accordingly, if the user holds the notebook PC 30, the pedestal 8 becomes unnecessary and the user can scan over books without the need for considering the distance to a wall outlet or plugging the cord in from one wall outlet to another wall outlet and without the need for being careful so as not to stumble on the coaxial cable 9. In this case, further if the notebook PC 30 is replaced with a PDA, the total weight is reduced and the user scan over books lightly.

The handy scanner 10 may be formed like any other shape as shown in FIGS. 9A to 9D (side views of other embodiments) and FIGS. 10A to 10F (perspective views of other embodiments).

Figure 9A:
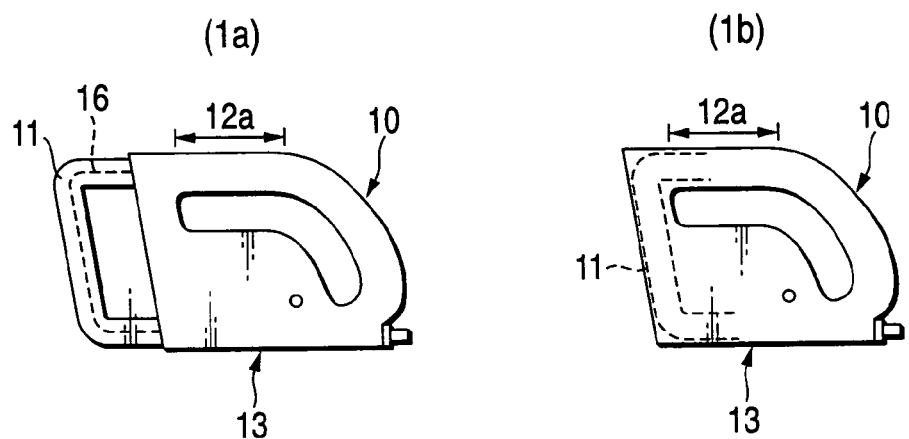
FIGS. 9A to 9D are schematic representations of other embodiments of handy scanner.
Figure 9B:
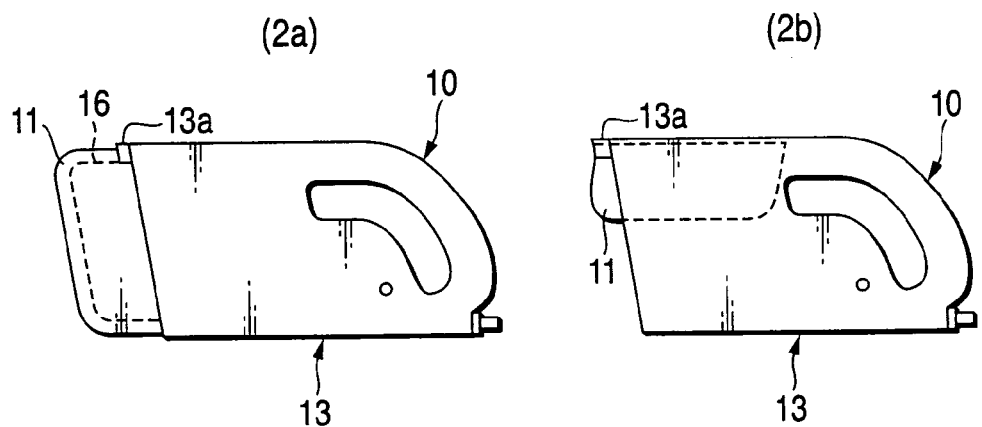

For example, as shown in FIGS. 9A and 9B, the handy scanner 10 can be formed so that the main unit 13 has a housing space inside thereof and the antenna sheath 11 can be housed in the housing space of the main unit 13 together with the antenna 16 contained in the antenna sheath 11. In these cases, when the handy scanner 10 is not used, the antenna 16 can be housed for protecting from a failure of buckling, etc.

Further, the weak communication area 11*b* can be used to conduct communications even in a state in which the antenna sheath 11 is housed. Therefore, for example, in the case shown in FIG. 9A, it is possible to conduct communications usually in a housed state as shown in FIG. 9A(1*b*) and for a thin book 3, project the antenna sheath 11 as shown in FIG. 9A(1*a*) and insert the antenna sheath 11 between books 3 for reading the data in the strong communication area 11*a*. The handy scanner 10 of FIG. 9A has the antenna sheath 11 the inside of which is made hollow to have a shape covering only the outer periphery of the antenna 16. Therefore, the antenna sheath 11 can be housed compact without shortening the horizontal part 12*a* or forming the main unit 13 back and forth long.

As shown in FIG. 9B, the handy scanner 10 can also be formed so that the antenna sheath 11 is pivotally supported in a pivotal support part formed on the front top of the main unit 13 and can be folded by pivoting so that the antenna sheath 11 is housed in the main unit 13. In this case, when the handy scanner 10 is used, the antenna sheath 11 is placed in a use state shown in FIG. 9 (2*a*); when the antenna sheath 11 is housed, it can be folded for protection as shown in FIG. 9 (2*b*).

Figure 9C:
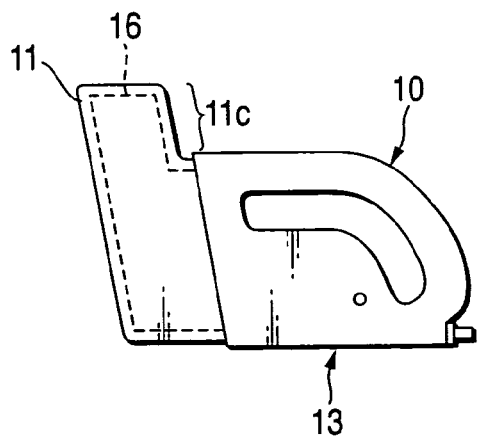

As shown in FIG. 9C, the top of the antenna sheath 11 may be projected as 11*c* and for a thin book 3, the projection 11*c* may be inserted between books 3 to use the handy scanner 10.

Figure 9D:
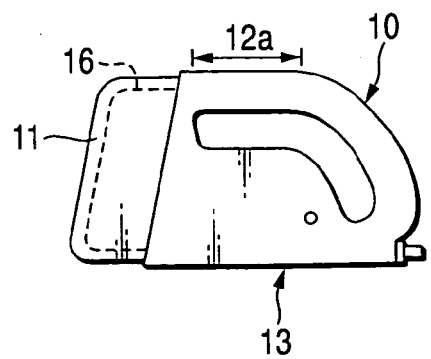

As shown in FIG. 9D, the antenna sheath 11 may be formed as a parallelogram with the lower side of the antenna sheath 11 projected to the front. In this case, if the user holds lightly the hold portion 12 so as to dangle the handy scanner 10, the front side of the antenna sheath 11 becomes roughly vertical (use state), making it possible to hold the handy scanner 10 at a good scanning angle in an easy hold manner.

As shown in FIGS. 10A to 10F, the antenna sheath 11 may be formed as a rectangle.

Figure 10A:
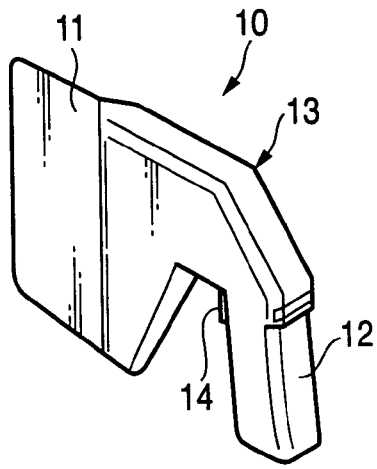
FIGS. 10A to 10F are schematic representations of other embodiments of handy scanner.

In FIG. 10A, the hold portion 12 is formed like a vertical bar and the operation switch 14 is placed at a position of a forefinger when the user grips the hold portion 12.

Figure 10B:
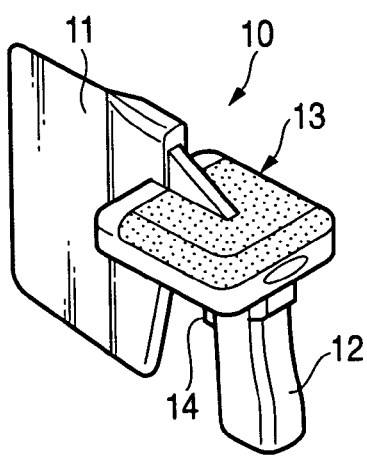
Figure 10C:
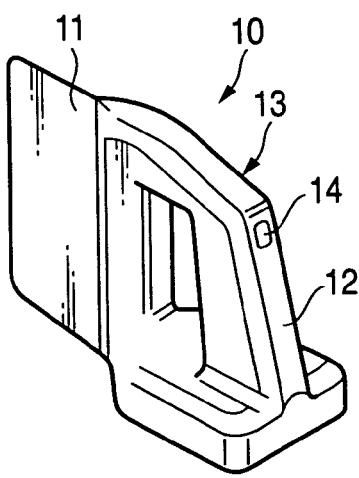

In FIGS. 10B and 10C, the hold portion 12 is formed like a vertical bar and the operation switch 14 is placed at a position of a thumb when the user grips the hold portion 12.

Figure 10D:
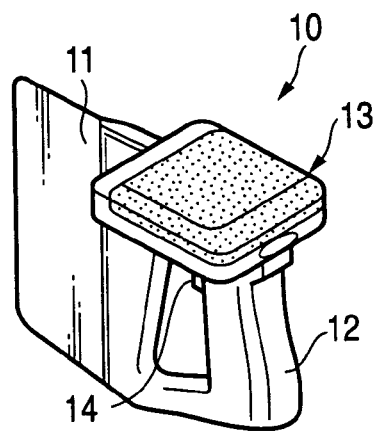

In FIG. 10D, the hold portion 12 is formed by joining a vertical bar part and a roughly horizontal bar part placed in a lower part and the operation switch 14 is placed at a position of a thumb when the user grips the vertical bar part.

Figure 10E:
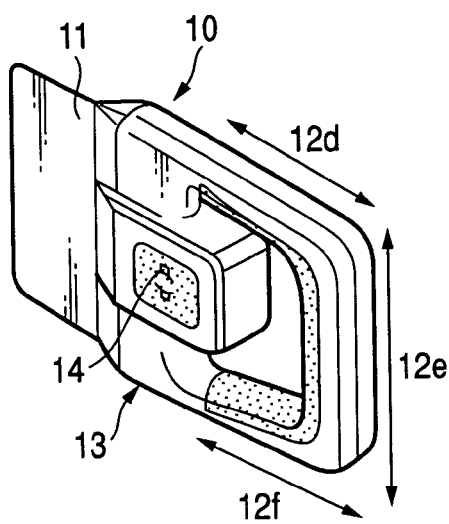

In FIG. 10E, the hold portion 12 is formed symmetrically like an angular U shape on a side view by joining an upper part 12d, an intermediate part 12e, and a lower part 12f each like a bar. The user holds the upper part 12d to scan over a book 3 in the lower part, the intermediate part 12e to scan over a book 3 at the medium stage, and the lower part 12f to scan over a book 3 at the upper stage. The handy scanner 10 can also be placed top side down for use, and the operation switch 14 is placed on the right side in the proximity of the front center of the main unit 13.

As the antenna sheath 11 is thus formed as a rectangle, if the user holds the handy scanner 10 staight, the front side of the antenna sheath 11 becomes vertical, enabling the user to scan over books without being aware of the scanning angle.

Figure 10F:
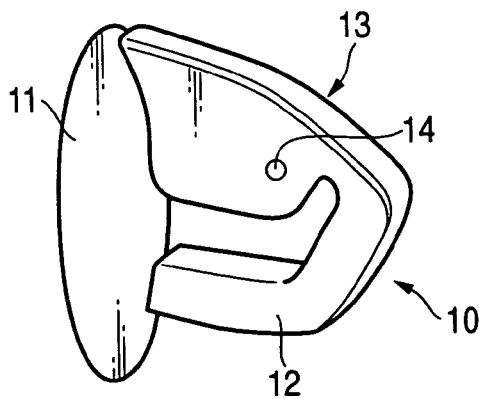

The handy scanner 10 with the upper part projected, previously described with reference to FIG. 9C may be formed so that the antenna sheath 11 is formed like an ellipse longer than is wide and the lower part is projected as shown in FIG. 10F.

The coaxial cable 9 may be able to be housed in the handy scanner 10 or the communication controller 40 by a method of winding, etc. Accordingly, a nuisance of stumbling on the coaxial cable 9 which is long more than necessary can be circumvented.

In the embodiment, the book management system 1 has been described with the books 3 stared on the shelves 2, but can be used to conduct efficient article management (inventory management, storage location management, collation of purchase record and sales record and inventory, etc., in an environment wherein articles each having an adequate thickness, such as CDs, DVDs, videotapes, cassette tapes, software packages, clothing items, or foods sold at a store, are placed on shelves.

Further, in the embodiment, the radio IC tag reader reads the data recorded on RF tag 4, but may be implemented as a radio IC tag reader-writer for executing write data to the RF tag 4 as well as read the data recorded on RF tag 4.

The correspondence between the components of the invention and those of the embodiment is as follows:

The radio IC tag read system of the invention corresponds to the book management system 1 of the embodiment;

the articles correspond to the books 3;

the radio IC tag reader corresponds to the handy scanner 10;

the hold portion corresponds to the hold portion 12;

the antenna corresponds to the antenna 16;

the computer corresponds to the notebook PC 30;

the communication controller corresponds to the communication controller 40; and the radio IC tag read apparatus corresponds to the handy scanner 10 and the communication controller 40.

However, the invention is not limited to the configuration of the embodiment described above, and many different embodiments of the invention may be made without departing from the spirit and scope thereof.

What is claimed is:

1. A radio IC tag reader comprising:
an antenna capable of conducting radio communications with an IC tag on which predetermined data is recorded, the IC tag being attached to an article;
a main unit for supplying power to the antenna; and
an antenna sheath for housing the antenna, the antenna sheath having a flat body, wherein the antenna sheath has a first side being attached to the main unit and a second side having a chamfered edge for preventing damage to the article when the antenna sheath is inserted between at least two such articles.

2. A radio IC tag reader comprising:
an antenna capable of conducting radio communications with an IC tag on which predetermined data is recorded, the IC tag being attached to an article;
a main unit for supplying power to the antenna; and
an antenna sheath for housing the antenna, the antenna sheath having a flat body attached to a front side of the main unit; and
a hold portion having a plurality of hold parts arranged at different hold angles to accommodate a hand of a user.

3. The radio IC tag reader as claimed in claim 2, wherein the main unit and the hold portion are formed integrally.

4. The radio IC tag reader as claimed in claim 1, wherein the antenna is formed of a metal wire.

5. The radio IC tag reader as claimed in claim 1, wherein the flat body has a plate body having flat surfaces opposed to each other.

6. The radio IC tag reader as claimed in claim 1, wherein corners of the second side of the antenna sheath are chamfered for preventing damage to the article when the antenna sheath is inserted between at least two such articles.

7. The radio IC tag reader as claimed in claim 1, wherein the main unit has a housing space inside thereof for housing the antenna and the antenna sheath.

8. A radio IC tag read apparatus comprising:
a radio IC tag reader including an antenna capable of conducting radio communications with an IC tag on which predetermined data is recorded, the IC tag being attached to an article;
a main unit for supplying power to the antenna, and a hold portion attached to the main unit, the hold portion having a plurality of hold parts arranged at different hold angles to accommodate a hand of a user;
an antenna sheath for housing the antenna, the antenna sheath having a flat body attached to a front side of the main unit; and
a communication controller being connected to the radio IC tag reader for performing communication control.

9. The radio IC tag read apparatus as claimed in claim 8, wherein the flat body of the antenna sheath has a plate body having flat surfaces opposed to each other.

10. A radio IC tag read system comprising:
a radio IC tag reader including an antenna capable of conducting radio communications with an IC tag on which predetermined data is recorded, the IC tag being attached to an article;
a main unit for supplying power to the antenna;
an antenna sheath for housing the antenna, the antenna sheath having a flat body attached to a front side of the main unit;
a communication controller being connected to the radio IC tag reader for performing communication control; and
a computer that can be connected to the communication controller for receiving the predetermined data recorded on the IC tag from the communication controller and checking the received data,
wherein the radio IC tag reader further includes a hold portion attached to the main unit, the hold portion having a plurality of hold parts arranged at different hold angles to accommodate a hand of a user.

* * * * *